United States Patent
Jackson

(10) Patent No.: US 9,982,781 B2
(45) Date of Patent: May 29, 2018

(54) PISTONS

(71) Applicant: Fisher Controls International LLC, Marshalltown, IA (US)

(72) Inventor: Trenton Frank Jackson, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 141 days.

(21) Appl. No.: 14/883,455

(22) Filed: Oct. 14, 2015

(65) Prior Publication Data

US 2016/0033041 A1    Feb. 4, 2016

Related U.S. Application Data

(63) Continuation of application No. 13/839,101, filed on Mar. 15, 2013, now Pat. No. 9,206,899.

(51) Int. Cl.
| | |
|---|---|
| *F01B 31/00* | (2006.01) |
| *F16J 9/08* | (2006.01) |
| *F16J 1/00* | (2006.01) |
| *F15B 15/14* | (2006.01) |
| *F16J 1/08* | (2006.01) |

(52) U.S. Cl.
CPC ............. *F16J 9/08* (2013.01); *F15B 15/1452* (2013.01); *F16J 1/008* (2013.01); *F16J 1/08* (2013.01)

(58) Field of Classification Search
CPC .. F16J 1/008; F16J 9/08; F16J 15/3208; F16J 15/322; F16J 15/3448; F15B 15/1452
USPC .......................................................... 92/183
See application file for complete search history.

(56) References Cited

U.S. PATENT DOCUMENTS

| | | | |
|---|---|---|---|
| 1,569,308 | A | 1/1926 | Smith |
| 2,518,097 | A | 8/1950 | Thornhill |
| 4,474,106 | A | 10/1984 | Durenec |
| 9,206,899 | B2 | 12/2015 | Jackson |
| 2014/0265150 | A1 | 9/2014 | Jackson |

FOREIGN PATENT DOCUMENTS

| | | |
|---|---|---|
| DE | 8403653 | 5/1985 |
| DE | 4340455 | 8/1994 |
| DE | 102006011482 | 9/2007 |
| JP | 04285367 | 10/1992 |

OTHER PUBLICATIONS

Patent Cooperation Treaty, "International Search Report," issued in connection with PCT Application No. PCT/US2014/022950, dated Aug. 14, 2014, 3 pages.

(Continued)

*Primary Examiner* — Michael Leslie

(74) *Attorney, Agent, or Firm* — Hanley, Flight & Zimmerman, LLC

(57) ABSTRACT

Pistons are disclosed herein. An apparatus includes an actuator defining a first chamber; and a piston disposed in the first chamber, the piston including a second chamber and a seal groove in which a seal is disposed, the second chamber to receive fluid from the first chamber to enable a force imparted by the fluid within the second chamber to urge the seal into sealing engagement with a surface defining the first chamber.

18 Claims, 5 Drawing Sheets

(56) References Cited

OTHER PUBLICATIONS

Patent Cooperation Treaty, "Written Opinion of the International Searching Authority," issued in connection with PCT Application No. PCT/US2014/022950, dated Aug. 14, 2014, 6 pages.
Patent Cooperation Treaty, "International Preliminary Report on Patentability," issued in connection with PCT Application No. PCT/US2014/022950, dated Sep. 15, 2015, 7 pages.
United States Patent and Trademark Office, "Non-Final Office Action," issued in connection with U.S. Appl. No. 13/839,101, dated Aug. 27, 2015, 9 pages.
United States Patent and Trademark Office, "Notice of Allowance," issued in connection with U.S. Appl. No. 13/839,101, dated Oct. 13, 2015, 11 pages.

PISTONS

RELATED APPLICATION

This patent arises from a continuation of U.S. patent application Ser. No. 13/839,101, entitled "Pistons," filed on Mar. 15, 2013. U.S. patent application Ser. No. 13/839,101. Priority to U.S. patent application Ser. No. 13/839,101 is hereby claimed. U.S. patent application Ser. No. 13/839,101 is hereby incorporated herein by reference in its entirety.

FIELD OF THE DISCLOSURE

This disclosure relates generally to piston actuators and, more particularly, to pistons.

BACKGROUND

A piston actuator typically includes a piston disposed inside a cylinder. The piston actuator may be single-acting or double-acting. If the piston actuator is single-acting, the piton actuator may employ fluid to drive the piston in one direction, and a spring may return the piston to a fail-safe position such as, for example, a closed position or an open position. If the piston actuator is double-acting, the piston actuator may employ fluid to drive the piston in either of two directions.

SUMMARY

Pistons are disclosed herein. An example apparatus includes a piston defining a chamber and a circumferential groove in communication with the chamber. At least a portion of the chamber is to be substantially filled with a fluid. The example apparatus also includes a piston ring disposed in the chamber and the groove. The fluid is to apply a first pressure to the piston ring to enable the piston ring to apply a second pressure to a cylinder wall. The second pressure is to be greater than the first pressure.

Another example apparatus disclosed herein includes a piston defining a fluid chamber and a circumferential groove in communication with the fluid chamber. A first seal is disposed in the fluid chamber. A second seal disposed in the groove and operatively coupled to the first seal. The first seal is to provide a fluid seal against the piston, and the second seal is to provide a fluid seal against a cylinder wall.

Another example apparatus disclosed herein includes a piston including a first end portion spaced apart from a second end portion to define a fluid chamber. The example apparatus also includes a piston ring disposed between the first end portion and the second end portion of the piston to define a first area in the fluid chamber and a second area in the fluid chamber. The first area is to be substantially filled with a fluid. A first portion of the piston ring is to form a fluid seal against the first end portion of the piston and the second end portion of the piston. A second portion of the piston ring is to form a fluid seal against a cylinder wall.

The features, functions and advantages that have been discussed can be achieved independently in various examples or may be combined in yet other examples further details of which can be seen with reference to the following description and drawings.

Figure 1:
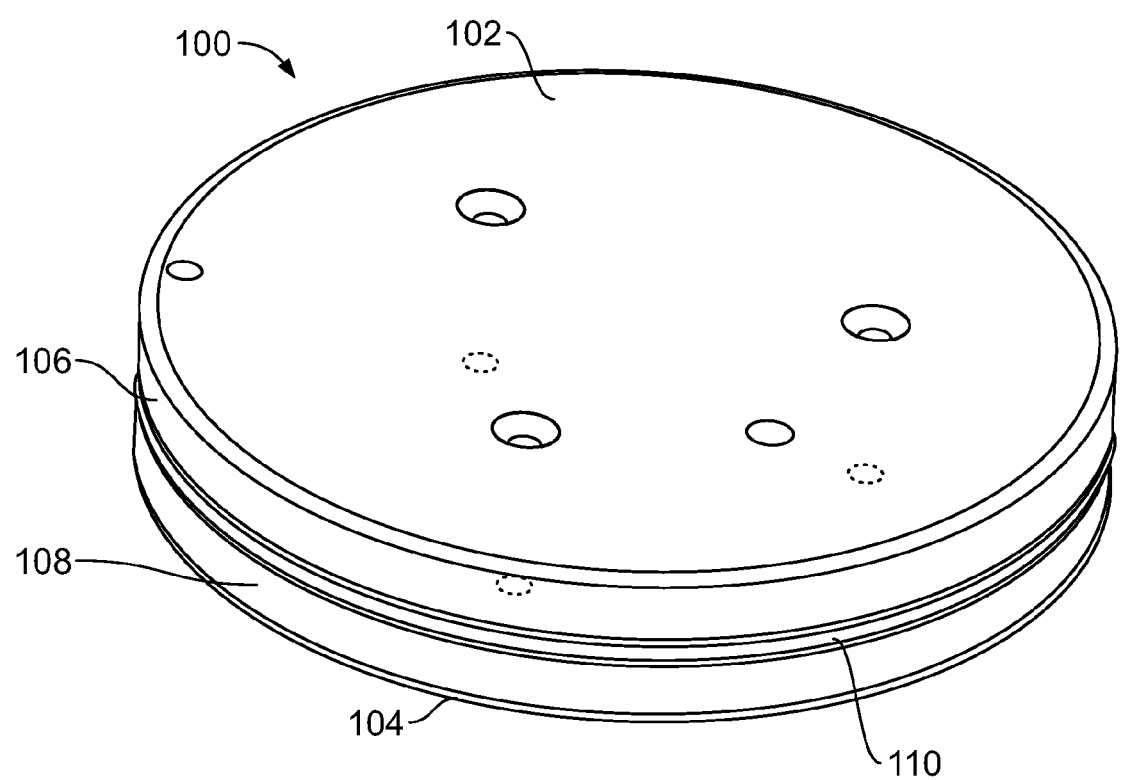
FIG. 1 illustrates an example piston disclosed herein.

Wherever possible, the same reference numbers will be used throughout the drawing(s) and accompanying written description to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Pistons are disclosed herein. An example piston disclosed herein may define a fluid chamber and a circumferential groove in communication with the fluid chamber. In some examples, a piston ring is disposed between two end portions of the piston. A first portion of the piston ring may be disposed in the fluid chamber, and a second portion of the piston ring may be disposed in the groove. In some examples, the first portion of the piston ring forms fluid seals against the two end portions of the piston to define a first area in the fluid chamber. Fluid in the first area of the fluid chamber may apply pressure to the first portion of the piston ring. As a result, the second portion of the piston ring may apply a second pressure to a cylinder wall to form a fluid seal against the cylinder wall. The second pressure may be greater than the first pressure. In some examples, a pressure differential is provided across the first portion of the piston ring to enable the first portion of the piston ring to transfer force to the second portion of the piston ring.

In some examples, the first portion of the piston ring is a first o-ring, and the second portion of the piston ring is a second o-ring. The first o-ring may have a first cross-sectional size greater than a second cross-sectional size of the second o-ring. In some examples, the first o-ring is in contact with the second o-ring to operatively couple the first o-ring and the second o-ring.

FIG. 1 illustrates an example piston 100 disclosed herein. The example piston 100 may be disposed in a cylinder 302 (FIG. 3) of a single-acting actuator, a double-acting actuator, and/or any other type of piston actuator to operate one or more devices such as, for example, a valve 326. The example piston 100 may be driven via any suitable fluid such as, for example, oil, water, air, etc. disposed on a first side 102 of the piston and/or a second side 104 of the piston.

The example piston 100 includes a first end portion 106 coupled to a second end portion 108. In the illustrated example, a piston ring 110 is disposed between the first end portion 106 and the second end portion 108. During operation of the example piston 100, the piston ring 110 forms a fluid seal against a wall 312 (FIG. 3) of the cylinder 302. Thus, the example piston ring 110 substantially prevents fluid from flowing from the first side 102 of the piston 100 to the second side 104 of the piston 100 and/or from the second side 104 of the piston 100 to the first side 102 of the piston 100. Although the example piston 100 of FIG. 1 includes one piston ring 110, other examples include other numbers (e.g., 2, 3, 4, etc.) of piston rings.

Figure 2:
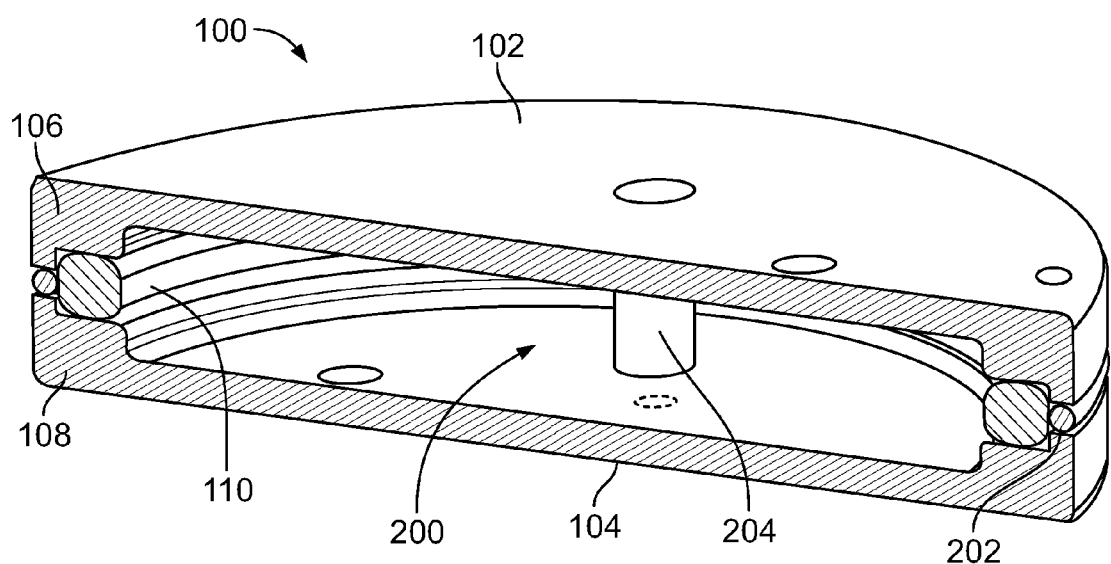
FIG. 2 is a cross-sectional view of the example piston of FIG. 1.

FIG. 2 is a perspective, cross-sectional view of the example piston 100 of FIG. 1. The example piston 100 defines a fluid chamber 200 and a circumferential groove 202 in communication with the fluid chamber 200. In the illustrated example, the first end portion 106 is spaced apart from the second end portion 108 via a spacer 204 to define the groove 202 and the fluid chamber 200 between the first end portion 106 and the second end portion 108. The example spacer 204 is disposed inside the fluid chamber 200 and extends from the first end portion 106 to the second end portion 108. In other examples, the first end portion 106 may be coupled to the second end portion 108 via a plurality of spacers, one or more mechanical fasteners (e.g., bolts), and/or any other suitable technique.

Figure 3:
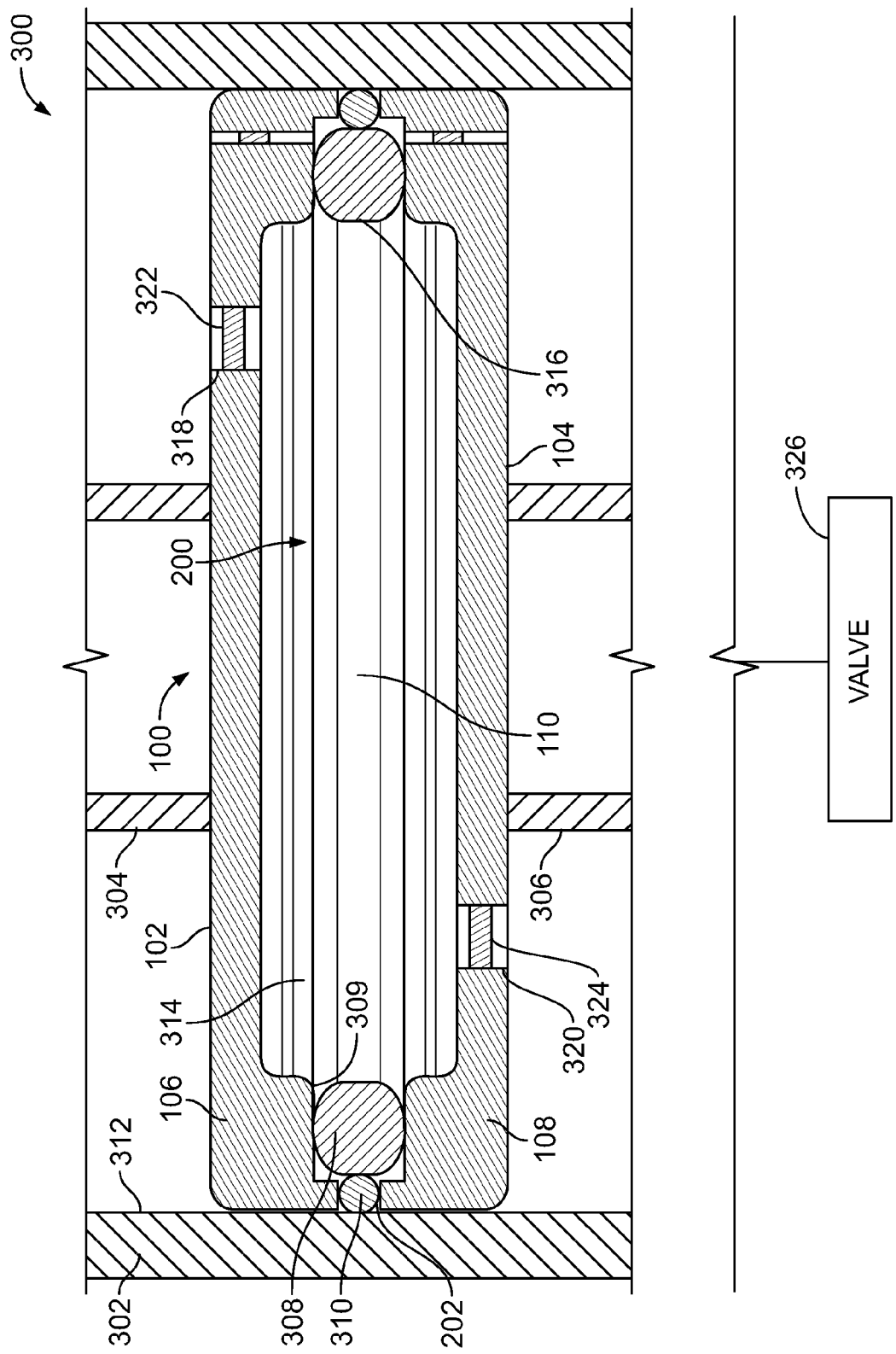
FIG. 3 is another cross-sectional view of the example piston of FIGS. 1-2.

FIG. 3 is another cross-sectional view of the example piston 100 of FIGS. 1-2 employed in a double-acting actuator 300. The example piston 100 is disposed in the cylinder 302. A first stem 304 is coupled to the first side 102 of the piston 100. A second stem 306 is coupled to the second side 104 of the piston 100. In other examples, the piston 100 may be coupled to a single stem.

The example piston ring 110 includes a first portion 308 disposed in a first seal groove 202 the fluid chamber 200 and a second portion 310 disposed in the second seal groove 309 adjacent the wall 312 of the cylinder 302. The first portion 308 of the example piston ring 110 forms fluid seals against the first end portion 106 and the second end portion 108 of the piston 100 to enable a first area 314 of the fluid chamber 200 to be substantially filled with a fluid and pressurized via the fluid. As described in greater detail below, a first pressure of the fluid in the first area 314 applied to the first portion 308 of the piston ring 110 enables the second portion 310 of the piston ring 110 to form a fluid seal against the wall 312 of the cylinder 302. In the illustrated example, the first area 314 is defined by the first end portion 106 of the piston 100, the second end portion 108 of the piston 100 and an inner diameter side 316 of the first portion 308 of the piston ring 110.

In some examples, fluid is flowed into the first area 314 of the fluid chamber 200 during operation of the actuator 300 to pressurize the first area 314. In the illustrated example, the first area 314 of the fluid chamber 200 receives fluid from within the cylinder 302 to fill the first area 314 with the fluid and/or pressurize the first area 314 to the first pressure. The example first end portion 106 of the piston 100 defines a first aperture or port 318 in fluid communication with the first area 314 and the cylinder 302. The example second end portion 108 of the piston 100 defines a second aperture or port 320 in fluid communication with the first area 314 and the cylinder 302. A first check valve 322 is disposed in the first port 318, and a second check valve 324 is disposed in the second port 320. In other examples, the piston 100 includes other numbers of check valves (e.g., 1, 3, 4, etc.) in communication with the first area 314 and the cylinder 302. In the illustrated example, the first check valve 322 and/or the second check valve 324 enables fluid to flow from the cylinder 302 into the first area 314 if the first pressure in the first area 314 is below a lower threshold pressure and/or if the fluid pressure in the cylinder 302 is above an upper threshold pressure. Thus, fluid pressures employed to drive the piston 100 may be used to pressurize the first area 314 to enable the piston ring 110 to form the fluid seal against the wall 312 of the cylinder 302.

In some examples, the first area 314 of the fluid chamber 200 is pressurized prior to operation. The piston 100 may be pressurized prior to operation by substantially filling the first area 314 with fluid during manufacture and/or assembly of the example piston 100. Once the piston ring 110 is disposed between the first end portion 106 and the second end portion 108 of the piston 100 and the first area 314 is pressurized via the fluid, the piston 100 may be subsequently assembled with a cylinder, a stem, and/or any other component(s) of an actuator.

Figure 4:
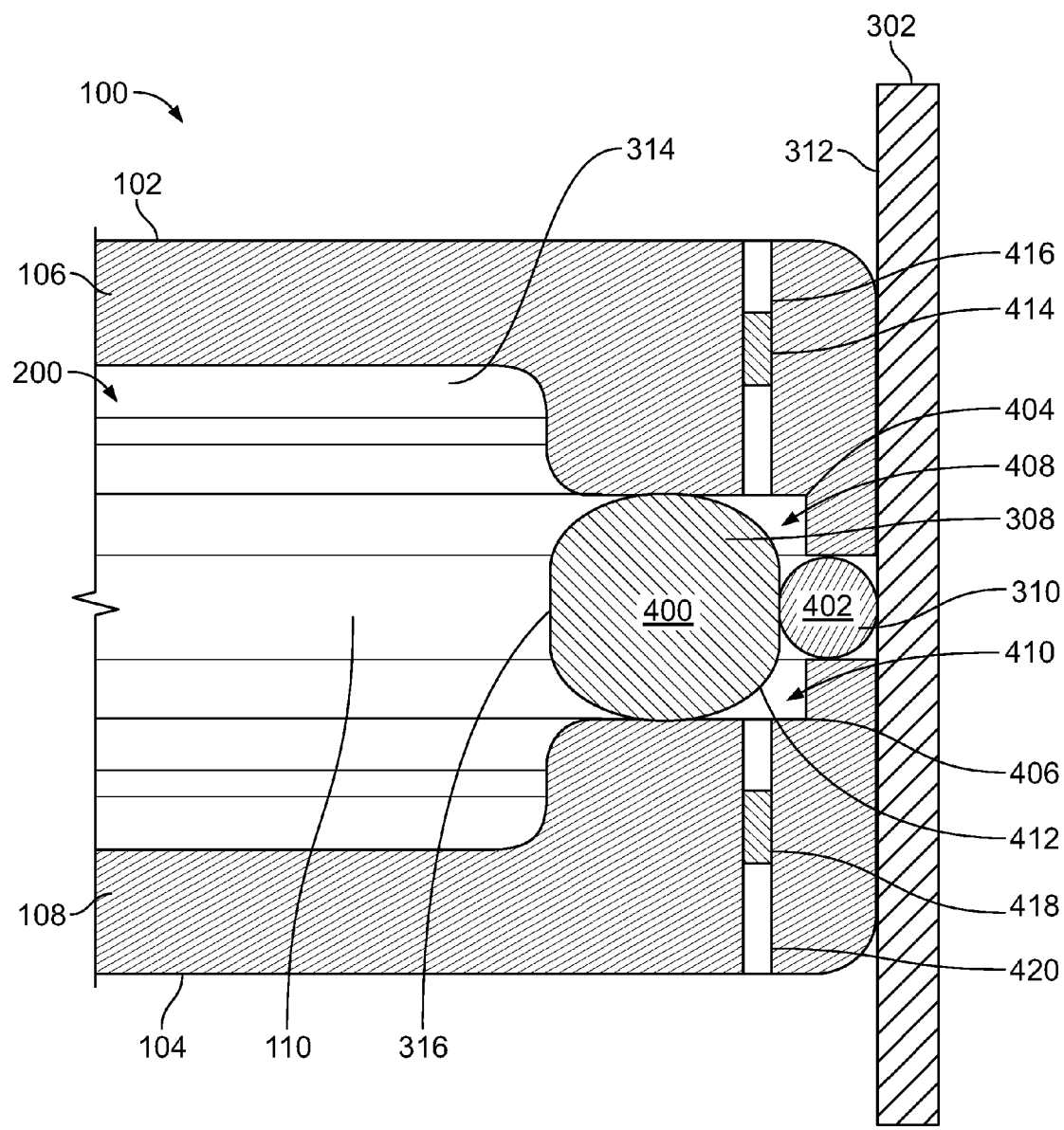
FIG. 4 is an enlarged, cross-sectional view of the example piston of FIGS. 1-3.

FIG. 4 is an enlarged, cross-sectional view of the example piston ring 110 of FIGS. 1-3. In the illustrated example, the piston 100 is substantially disk-shaped and the first portion 308 of the piston ring 110 is a first o-ring 400, and the second portion 310 of the piston ring 110 is a second o-ring 402. In other examples, the piston 100 is other shapes (e.g., rectangular, triangular, hexagonal, oblong, etc.) and the first portion 308 and the second portion 310 of the piston ring 110 are shaped (e.g., rectangularly, triangularly, etc.) to substantially conform to the shape of the piston 100. In the illustrated example, the first o-ring 400 is in contact with the second o-ring 402 to operatively couple the first o-ring 400 to the second o-ring 402. The first o-ring 400 and the second o-ring 402 illustrated in FIG. 4 are substantially concentric. In some examples, the first portion 308 and the second portion 310 of the piston ring 110 are integral (e.g., the piston ring 110 is a single o-ring or other element). In other examples, the piston ring 110 includes three or more discrete o-rings. In the illustrated example, the first o-ring 400 has a first cross-sectional size (e.g., a cross-sectional diameter) and the second o-ring 402 has a second cross-sectional size smaller than the first cross-sectional size. The first o-ring 400 and/or the second o-ring 402 may have any suitable cross-sectional shape (e.g., circular, hexagonal, rectangular, etc.).

The example first o-ring 400 is disposed in the second seal groove 309 between the first end portion 106 and the second end portion 108 of the piston 100 adjacent the groove 202. In the illustrated example, the first o-ring 400 and the second o-ring 402 have rounded cross-sectional shapes and the piston 100 defines the fluid chamber 200 having substantially right-angled corners 404 and 406 adjacent the groove 202. As a result, the piston ring 110 and the first end portion 106 of the piston 100 define a second area 408 in the fluid chamber 200 adjacent one of the corners 404. The piston ring 110 and the second end portion 108 of the piston 100 define a third area 410 in the fluid chamber 200 between the piston ring 110 and other one of the corners 406.

In some examples, fluid is substantially removed from (e.g., drained, released, flowed out of, etc.) the second area 408 and/or the third area 410, thereby at least partially releasing and/or reducing pressure within the second seal groove 309. Thus, pressures in the second area 408 and/or the third area 410 may be substantially atmospheric. In some examples, fluid may fill some or all of the second area 408 and/or the third area 410. Thus, the fluid may be disposed in the fluid chamber 200 on the inner diameter side 316 of the first o-ring 400 and on an outer diameter side 412 of the first a-ring 400. Pressures of the fluid in the second area 408 and the third area 410 are less than the first pressure of the fluid in the first area 314 to provide a pressure differential across the first o-ring 400. In the illustrated example, a first relief valve 414 is disposed in a third port 416 defined by the first end portion 106 of the piston 100. The first relief valve 414 is in fluid communication with the second area 408 to control the fluid pressure in the second area 408. A second relief valve 418 is disposed in a fourth port 420 defined by the second end portion 108 of the piston 100. The second relief valve 418 is in fluid communication with the third area 410 to control the fluid pressure in the third area 410. In some examples, the first relief valve 414 and/or the second relief valve 418 are in communication with a lowest pressure area of the cylinder 102 (e.g., an area in the cylinder 302 including fluid that is not employed to drive the piston 100). As a result of the pressure differential between the first area 314 and the second and third areas 408 and 410, force applied by the fluid in the first area 314 to the first a-ring 400 is transferred to the second a-ring 402. When the force is applied to the second a-ring 402, the second a-ring 402 applies the force to the wall 312 of the cylinder 302 to form the fluid seal against the wall 312 of the cylinder 302. Because the cross-sectional size of the second a-ring 402 is smaller than the cross-sectional size of the first a-ring 400, the second a-ring 402 applies a second pressure to the wall 312 of the cylinder 302 greater than the first pressure applied to the first a-ring 400 via the fluid in the first area 314.

The value of second pressure is a function of the pressure differential across the first o-ring 400, the cross-sectional size of the first o-ring 400, and the cross-sectional size of the second o-ring 402. Thus, the first pressure, pressures in the second area 408 and the third area 410 and/or dimensions of the piston ring 110 may be chosen to enable the piston ring 110 to apply a desired value of the second pressure against the cylinder wall 312. In some examples, the desired value of the second pressure is a minimum pressure to form the fluid seal ("a sealing pressure") against the cylinder wall 312 via the second o-ring 402. Thus, the pressure differential across the first o-ring 400 and/or the dimensions of the piston ring 110 may be chosen so that the second pressure substantially equals the sealing pressure, thereby minimizing wear to the piston ring 110 due to the second pressure of the second o-ring 402 against the wall 312 of the cylinder 302. In other examples, the pressure differential and/or the dimensions of the piston ring 110 may be chosen so that the second pressure is greater than the sealing pressure.

Figure 5:
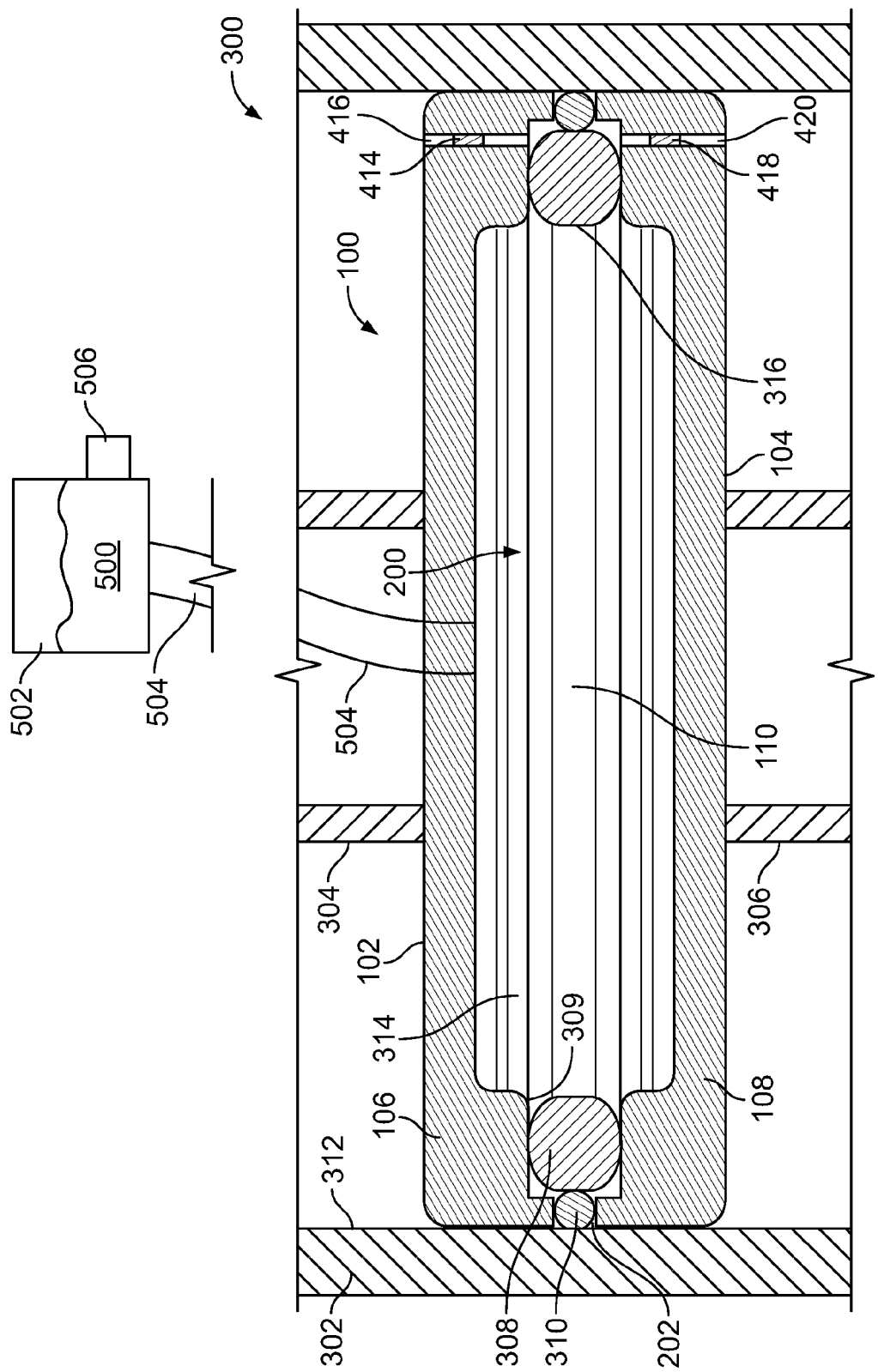
FIG. 5 illustrates the example piston of FIGS. 1-4 in communication with a fluid reservoir.

FIG. 5 illustrates another example technique to pressurize the chamber 200 of the example piston 100. In the illustrated example, the first area 314 is pressurized via fluid 500 from a fluid reservoir 502 disposed outside of the cylinder 302. In the illustrated example, the piston 100 does not include the first check valve 322 and/or the second check valve 324. The fluid 500 may be flowed into the first area 314 via a conduit 504 (e.g., a flowline, hose, etc.) in fluid communication with the first area 314 and the fluid reservoir 502. In the illustrated example, the conduit 504 is directed from the fluid reservoir 502 to the piston 100 via the first stem 304. The fluid 500 in the fluid reservoir 502 may be flowed (e.g., pumped) into the first area 314 and/or pressurized to increase the first pressure inside the first area 314. In some examples, a pressure of the fluid 500 in the fluid reservoir 502 is monitored via a pressure sensor 506 in communication with the fluid reservoir 502. Thus, by controlling the flow of the fluid 500 into the first area 314 from the fluid reservoir 502 and/or by controlling the pressure of the fluid 500 in the fluid reservoir 502, the first pressure in the first area 314 may be controlled during operation.

An example apparatus includes a piston defining a chamber and a circumferential groove in communication with the chamber, at least a portion of the chamber to be substantially filled with a fluid; and a piston ring disposed in the chamber and the groove, wherein the fluid is to apply a first pressure to the piston ring to enable the piston ring to apply a second pressure to a cylinder wall, the second pressure greater than the first pressure.

In some examples, the piston ring comprises a first o-ring operatively coupled to a second o-ring. In some examples, the first o-ring is in contact with the second o-ring. In some examples, the first o-ring has a first size and the second o-ring has a second size less than the first size, the first o-ring to be disposed in the chamber, the second o-ring to be disposed in the groove. In some examples, the piston ring comprises a first portion having a first size and a second portion having a second size less than the first size. In some examples, the piston ring is to form a fluid seal against the piston to enable the fluid in a first portion of the chamber to have the first pressure and the fluid in a second portion of the chamber to have a third pressure less than the first pressure. In some examples, the apparatus includes a relief valve in fluid communication with the chamber. In some examples, the apparatus includes a check valve in fluid communication with the chamber.

An example apparatus includes a piston defining a fluid chamber and a circumferential groove in communication with the fluid chamber; a first seal disposed in the fluid chamber; and a second seal disposed in the groove and operatively coupled to the first seal, wherein the first seal is to provide a fluid seal against the piston, and the second seal is to provide a fluid seal against a cylinder wall. In some examples, the first seal comprises a first o-ring, and the second seal comprises a second o-ring. In some examples, first o-ring is in contact with the second o-ring. In some examples, a fluid in the fluid chamber is to have a first pressure on a first side of the first seal and a second pressure on a second side of the first seal, the first pressure greater than the second pressure. In some examples, the apparatus includes a relief valve in fluid communication with the fluid chamber.

In some examples, the first seal has a first size, and the second seal has a second size smaller than the first size. In some examples, the piston comprises a first end portion coupled to a second end portion via a spacer.

An example apparatus, includes a piston including a first end portion spaced apart from a second end portion to define a fluid chamber; and a piston ring disposed between the first end portion and the second end portion of the piston to define a first area in the fluid chamber and a second area in the fluid chamber, the first area to be substantially filled with a fluid, wherein a first portion of the piston ring is to form a fluid seal against the first end portion of the piston and the second end portion of the piston, and a second portion of the piston ring is to form a fluid seal against a cylinder wall.

In some examples, the first portion of the piston ring has a first size and the second portion of the piston ring has a second size smaller than the first size. In some examples, a pressure differential is to be provided across the first portion of the piston ring. In some example, the piston defines a circumferential groove, and the second portion of the piston ring is disposed in the groove. In some examples, the apparatus includes a relief valve in communication with the second area of fluid chamber.

An example apparatus includes a piston defining a chamber and a circumferential groove in communication with the chamber, at least a portion of the chamber to be substantially filled with a fluid; and a piston ring disposed in the chamber and the groove, wherein the fluid is to apply a first pressure to the piston ring to enable the piston ring to apply a second pressure to a cylinder wall, the second pressure greater than the first pressure, the piston ring comprises a first o-ring operatively coupled to a second o-ring, the first o-ring is in contact with the second o-ring. In some examples, the apparatus includes a valve in fluid communication with the chamber. In some examples, the valve includes at least one of a check valve or a relief valve.

In some examples, an example apparatus includes a piston defining a chamber and a circumferential groove in communication with the chamber, at least a portion of the chamber to be substantially filled with a fluid; and a piston ring disposed in the chamber and the groove, wherein the fluid is to apply a first pressure to the piston ring to enable the piston ring to apply a second pressure to a cylinder wall, the second pressure greater than the first pressure, the piston ring comprises a first o-ring operatively coupled to a second o-ring, the first o-ring has a first size and the second o-ring has a second size less than the first size, the first o-ring to be disposed in the chamber, the second o-ring to be disposed in the groove. In some examples, the apparatus includes a valve in fluid communication with the chamber.

An example apparatus includes a piston defining a chamber and a circumferential groove in communication with the chamber, at least a portion of the chamber to be substantially filled with a fluid; and a piston ring disposed in the chamber and the groove, wherein the fluid is to apply a first pressure to the piston ring to enable the piston ring to apply a second pressure to a cylinder wall, the second pressure greater than the first pressure, the piston ring comprises a first portion having a first size and a second portion having a second size less than the first size. In some examples, the piston ring includes a first o-ring operatively coupled to a second o-ring. In some examples, the apparatus includes a valve in fluid communication with the chamber.

An example apparatus includes a piston defining a chamber and a circumferential groove in communication with the chamber, at least a portion of the chamber to be substantially filled with a fluid; and a piston ring disposed in the chamber and the groove, the fluid is to apply a first pressure to the piston ring to enable the piston ring to apply a second pressure to a cylinder wall, the second pressure greater than the first pressure, the piston ring is to form a fluid seal against the piston to enable the fluid in a first portion of the chamber to have the first pressure and the fluid in a second portion of the chamber to have a third pressure less than the first pressure. In some examples, the piston ring includes a first o-ring operatively coupled to a second o-ring. In some examples, the apparatus includes a valve in fluid communication with the chamber.

An example apparatus includes a piston defining a fluid chamber and a circumferential groove in communication with the fluid chamber; a first seal disposed in the fluid chamber; and a second seal disposed in the groove and operatively coupled to the first seal, wherein the first seal is to provide a fluid seal against the piston, and the second seal is to provide a fluid seal against a cylinder wall. In some examples, the first seal comprises a first o-ring, and the second seal comprises a second o-ring. In some examples, the first o-ring is in contact with the second o-ring. In some examples, a fluid in the fluid chamber is to have a first pressure on a first side of the first seal and a second pressure on a second side of the first seal, the first pressure greater than the second pressure. In some examples, the apparatus includes a relief valve in fluid communication with the fluid chamber. In some examples, the first seal has a first size, and the second seal has a second size smaller than the first size. In some examples, the piston includes a first end portion coupled to a second end portion via a spacer.

An example apparatus includes a piston including a first end portion spaced apart from a second end portion to define a fluid chamber; and a piston ring disposed between the first end portion and the second end portion of the piston to define a first area in the fluid chamber and a second area in the fluid chamber, the first area to be substantially filled with a fluid, wherein a first portion of the piston ring is to form a fluid seal against the first end portion of the piston and the second end portion of the piston, and a second portion of the piston ring is to form a fluid seal against a cylinder wall, wherein the first portion of the piston ring has a first size and the second portion of the piston ring has a second size smaller than the first size.

An example piston includes a first end portion spaced apart from a second end portion to define a fluid chamber; and a piston ring disposed between the first end portion and the second end portion of the piston to define a first area in the fluid chamber and a second area in the fluid chamber, the first area to be substantially filled with a fluid, wherein a first portion of the piston ring is to form a fluid seal against the first end portion of the piston and the second end portion of the piston, and a second portion of the piston ring is to form a fluid seal against a cylinder wall, wherein a pressure differential is to be provided across the first portion of the piston ring. In some examples, the piston defines a circumferential groove, and the second portion of the piston ring is disposed in the groove. In some examples, the piston defines a circumferential groove, and the second portion of the piston ring is disposed in the groove.

An example apparatus includes a piston including a first end portion spaced apart from a second end portion to define a fluid chamber; a piston ring disposed between the first end portion and the second end portion of the piston to define a first area in the fluid chamber and a second area in the fluid chamber, the first area to be substantially filled with a fluid, wherein a first portion of the piston ring is to form a fluid seal against the first end portion of the piston and the second end portion of the piston, and a second portion of the piston ring is to form a fluid seal against a cylinder wall; and a relief valve in communication with the second area of fluid chamber. In some examples, the piston defines a circumferential groove, and the second portion of the piston ring is disposed in the groove.

Although certain example methods, apparatus and articles of manufacture have been described herein, the scope of coverage of this patent is not limited thereto. Such examples are intended to be non-limiting illustrative examples. On the contrary, this patent covers all methods, apparatus and articles of manufacture fairly falling within the scope of the appended claims either literally or under the doctrine of equivalents.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

What is claimed is:

1. An apparatus, comprising:
   an actuator defining a first chamber; and
   a piston disposed in the first chamber, the piston including a second chamber and a seal groove in which a seal is disposed, the second chamber to receive fluid from the first chamber to enable a force imparted by the fluid within the second chamber to urge the seal into sealing engagement with a surface defining the first chamber;
   wherein the piston includes a relief valve to enable the fluid within the second chamber to be released if a pressure of the fluid within the second chamber is greater than a threshold.

2. The apparatus of claim 1, wherein the piston includes opposing portions to be coupled via a fastener.

3. The apparatus of claim 2, further including a spacer disposed in the second chamber and extending between the opposing portions, the fastener to extend through the spacer.

4. The apparatus of claim 1, wherein the seal is a first seal and the seal groove is a first seal groove, wherein the piston includes a second seal groove in which a second seal is disposed, the first seal to be disposed between the second seal and the surface.

5. The apparatus of claim 4, wherein the first seal groove has a smaller cross-section than the second seal groove and the first seal has a smaller cross-section than the second seal.

6. The apparatus of claim 4, wherein the force imparted by the fluid on the first seal is to be increased to a second force based on the second seal engaging the first seal and the first seal having a first cross-sectional area and the second seal having a second cross-sectional area, the first cross-sectional area being smaller than the second cross-sectional area.

7. The apparatus of claim 4, wherein the first seal groove has a first cross-section, the second seal groove has a second cross-section, and the second chamber has a third cross-section, the third cross-section being larger than the second cross-section, the second cross-section being larger than the first cross-section.

8. The apparatus of claim 7, wherein the second seal groove is positioned between the first seal groove and the second chamber to enable the fluid within the second chamber to influence the first seal.

9. The apparatus of claim 8, wherein the first seal groove is coupled to the second chamber.

10. An apparatus, comprising:
an actuator defining a first chamber; and
a piston disposed in the first chamber, the piston including a second chamber, a first seal groove in which a first seal is disposed, a second seal groove in which a second seal is disposed, and a relief valve, the first seal to be disposed between the second seal and a surface defining the first chamber, the second chamber to receive fluid from the first chamber to enable a force imparted by the fluid within the second chamber to urge the first seal into sealing engagement with the surface, the relief valve to enable fluid within the second seal groove to be released if a pressure of the fluid within the second seal groove is greater than a threshold, the fluid to be received from the first chamber.

11. An apparatus, comprising:
an actuator defining a first chamber;
a piston disposed in the first chamber, the piston including a second chamber, a seal groove in which a seal is disposed, and a relief valve to enable fluid within the second chamber to be released if a pressure of the fluid within the second chamber is greater than a threshold; and
means for urging the seal into sealing engagement with a surface defining the first chamber, wherein the means for urging the seal into sealing engagement with the surface includes an aperture defined by the piston to enable the second chamber to receive the fluid from the first chamber to enable a force imparted by the fluid within the second chamber to urge the seal into sealing engagement with the surface.

12. The apparatus of claim 11, wherein the relief valve is spaced from the aperture.

13. The apparatus of claim 11, wherein the seal is a first seal and the seal groove is a first seal groove, wherein the piston includes a second seal groove in which a second seal is disposed, the first seal to be disposed between the second seal and the surface.

14. The apparatus of claim 13, wherein the first seal groove has a smaller cross-section than the second seal groove and the first seal has a smaller cross-section than the second seal.

15. The apparatus of claim 13, wherein the force imparted by the fluid on the first seal is to be increased to a second force based on the second seal engaging the first seal and the first seal having a first cross-sectional area and the second seal having a second cross-sectional area, the first cross-sectional area being smaller than the second cross-sectional area.

16. The apparatus of claim 11, wherein the piston includes opposing portions to be coupled via a fastener.

17. The apparatus of claim 16, further including a spacer extending between the opposing portions to define the second chamber, the fastener to extend through the spacer.

18. An apparatus, comprising:
an actuator defining a first chamber;
a piston disposed in the first chamber, the piston including a second chamber, a seal groove in which a seal is disposed, a first relief valve disposed to vent in a first direction and a second relief valve disposed to vent in a second direction; and
means for urging the seal into sealing engagement with a surface defining the first chamber, wherein the means for urging the seal into sealing engagement with the surface includes an aperture defined by the piston to enable the second chamber to receive fluid from a flowline to enable a force imparted by the fluid within the second chamber to urge the seal into sealing engagement with the surface.

\* \* \* \* \*